Jan. 18, 1927.
A. B. CRAIG
1,615,110
ROTARY INTERNAL COMBUSTION ENGINE
Filed April 4, 1925   3 Sheets-Sheet 1
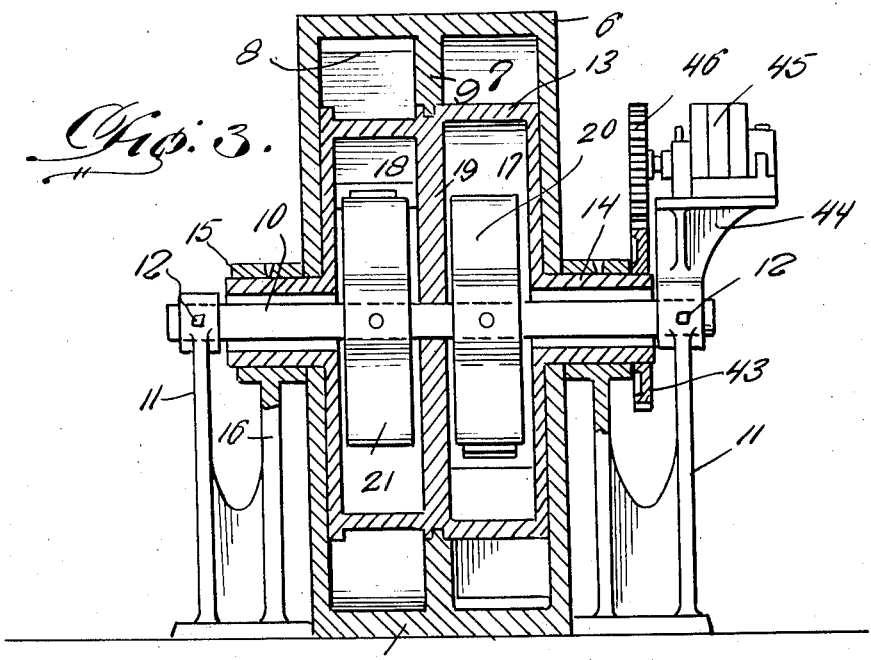
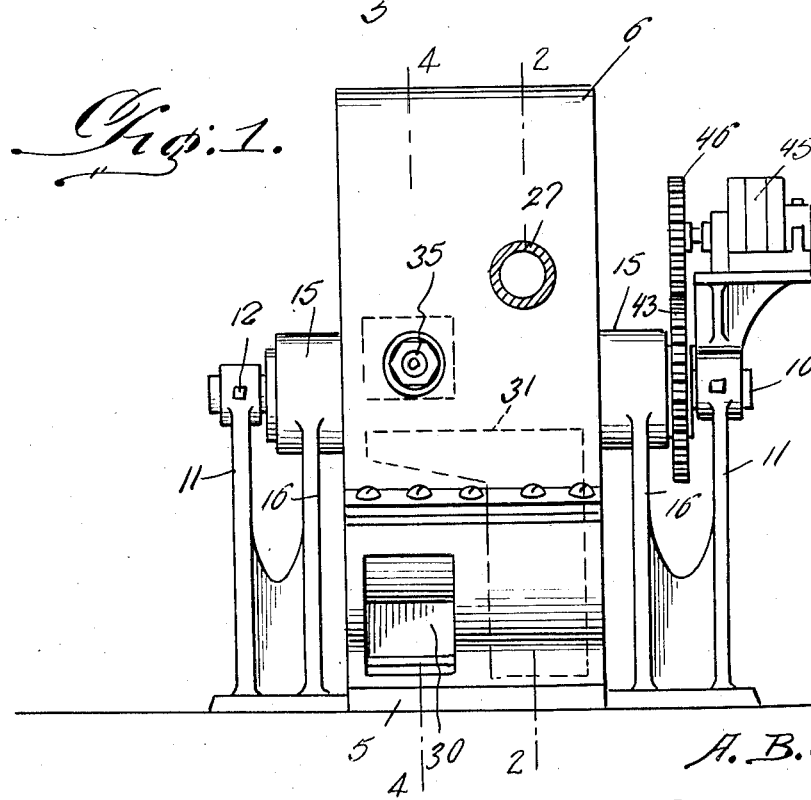
Inventor
A. B. Craig,
By Clarence O'Brien
Attorney Jan. 18, 1927.
A. B. CRAIG
1,615,110
ROTARY INTERNAL COMBUSTION ENGINE
Filed April 4, 1925    3 Sheets-Sheet 2
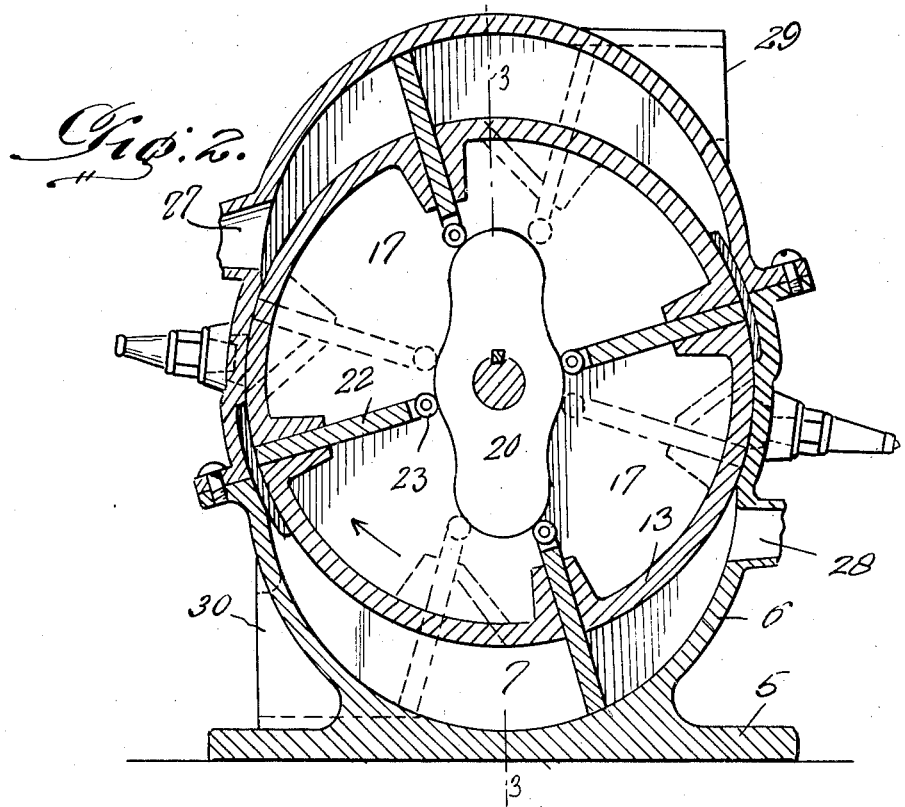
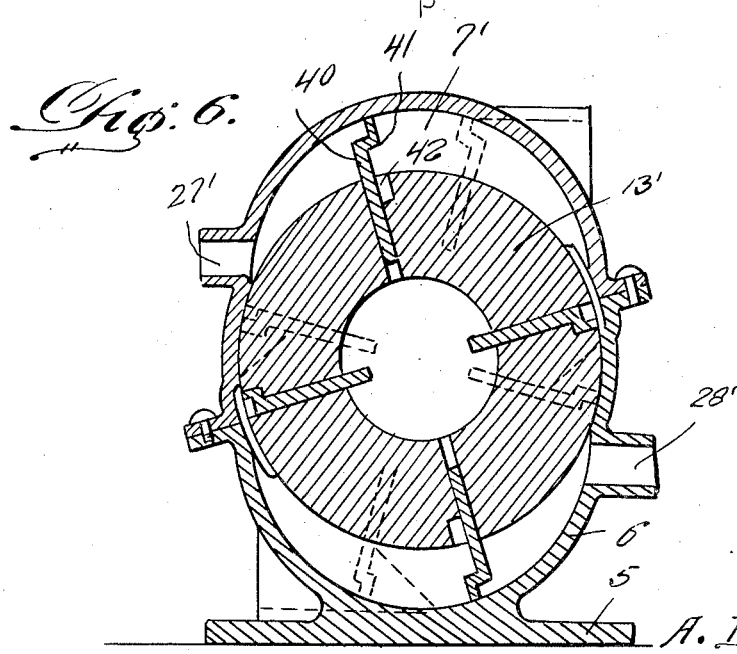
Inventor
A. B. Craig,
By Clarence O'Brien
Attorney Jan. 18, 1927. 1,615,110
A. B. CRAIG
ROTARY INTERNAL COMBUSTION ENGINE
Filed April 4, 1925  3 Sheets-Sheet 3

Inventor
A. B. Craig,

By
Attorney

Patented Jan. 18, 1927.

1,615,110

UNITED STATES PATENT OFFICE.

ARTHUR B. CRAIG, OF BETHESDA, MARYLAND.

ROTARY INTERNAL-COMBUSTION ENGINE.

Application filed April 4, 1925. Serial No. 20,717.

The present invention relates to rotary internal combustion engines, and aims to generally improve upon such structures for increasing the efficiency thereof so as to obtain the maximum power from the explosive charges.

Another object of the invention is to provide a rotary internal combustion engine which is light and inexpensive in structure and in which adequate provision is made for the radiation and dissipation of heat from the interior of the rotor, so that heat is radiated from the interior as well as the exterior of the engine and undue heating of the engine in operation is thereby averted.

An important object of the invention is to provide an engine of this nature having a stator casing divided into a pair of compartments, and a rotor with blades arranged thereabout, some adapted to operate in one compartment, and the others to operate in the other compartment. The blades that work in one compartment compress the gas and deliver it to the other compartment for expansion.

Another important object of the invention is to provide means for properly operating the blades of the rotor so that they will function efficiently.

With the above and numerous other objects in view as will appear as the description proceeds, the invention resides in certain novel features of construction, and in the combination and arrangement of parts as will be hereinafter more fully described and claimed.

In the drawings:—

Figure 1 is an end elevation of the engine embodying the features of my invention.

Figure 2 is a vertical longitudinal section therethrough taken on the line 2—2 of Figure 1.

Figure 3 is a vertical transverse section therethrough taken on line 3—3 of Figure 2.

Figure 6 is a vertical longitudinal section through a modified form of the edge showing particularly the compression compartment.

Figure 4:
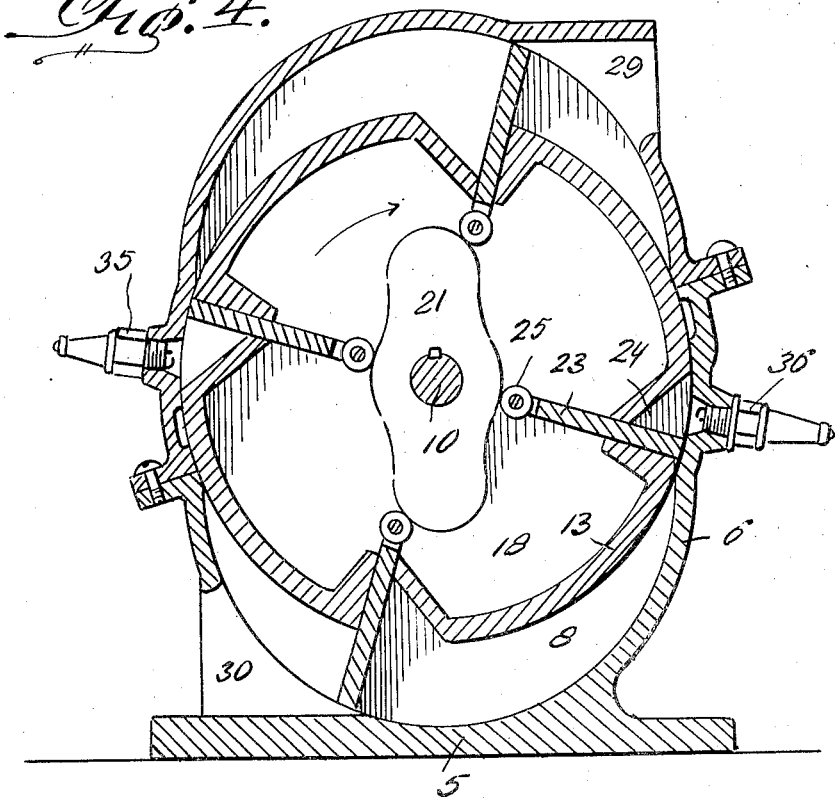
Figure 4 is another vertical longitudinal section therethrough taken on line 4—4 of Figure 1.
Figure 5:
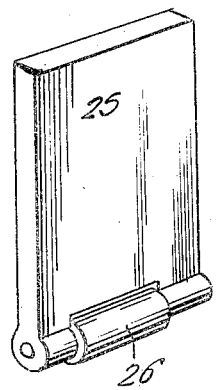
Figure 5 is a perspective view of one of blades.

Referring to the drawings in detail, it will be seen that 5 designates the base on which is mounted a stator casing 6, which is of a hollow formation and is oblong vertically. The stator casing 6 is divided into compartments 7 and 8 by a partition 9. A shaft 10 extends through the casing being supported by standards 11. This is a stationary shaft being prevented from rotation by elements 12. A rotor 13 is mounted in the stator casing 6, and is provided with hollow trunnions 14 rotatably receivable in bearings 15 on standards 16. These hollow trunnions 14 receive the shaft 10 therein. The rotor is divided into compartments 17 and 18 by a partition 19. A cam element 20 is fixed to the stationary shaft 10 and disposed within the compartment 17. A cam 21 is fixed to the stationary shaft 10 and is disposed within the compartment 18. A plurality of blades 22 are slidable radially through the periphery of the rotor into the compartment 17 for engaging the outer surface of the compartment 7, the inner ends of the blades 22 have rollers 23 journaled thereon for engagement with the cam 20 which is so shaped so as to dispose the blade for proper operation in the compartment 7. The annular wall of the rotor 13 about the compartment 18 is provided with pockets 24, each having a slanting wall, and a radially disposed wall. Blades 25 are slidable through the outer wall of the compartment 18 along the radial walls of the pockets 24 and the inner ends of these blades have mounted thereon rollers 26 which engage the cam 21 so that the outer end of the blades will be disposed properly in the expansion compartment 8 for the efficient operation of the engine.

The compartment 7 of the stator casing 6 is provided with a pair of intake openings 27 and 28 disposed at diametrically opposed points in relation to the axis of the rotor. The compartment 8 of the stator casing is provided with exhaust openings 29 and 30 also disposed at diametrically opposite points in relation to the axis of the rotor. A line drawn between the exhaust openings would be perpendicular to a line drawn between the intake openings. In advance of the intake openings 27 and 28 there are provided in the stator casing, passages 31 communicating with the compartments 7 and 8. Spark plugs 35 and 36 are mounted in the compartment 8 of the stator casing 6 in advance of the passages 31.

As the rotor is moving in a clockwise direction, as illustrated in the accompanying drawings, it will be seen that as the blades 22 pass by the intake openings 27 and 28, they will cause a suction so as to draw in the fumes. Referring particularly to the intake opening 28 as shown in Figure 2 it will be seen that fuel will be drawn into the chamber disposed adjacent thereto, and as the blade advances to the dotted line position it will compress the gas which was drawn in by the blade in advance thereof. As this blade approaches the passage 31, one of the pockets 24 will come into registry with the passage 31 so that the gas may pass over into the compartment 8 and fill said pocket, and after the pocket has advanced out of registry with the passage 31 it will be ignited by one of the spark plugs, and as the rotor advances further, the ignited gas will have an opportunity of expanding, and will give an impulse to the rotor. This action just described is carried on in a continuous manner as will be evident to those skilled in this art.

Particular attention is now directed to the modification shown in Figure 6, wherein the compartment 7' is similar to compartment 7 having intake openings 27' and 28'. The rotor 13' differs from the rotor 13 in as far as that portion thereof is concerned which is disposed in the compartment 7'. Blades 40 are slidable through the rotor but do not engage a cam 20, as in the previous modification, but are held in their extended positions by centrifugal force and also by the provision of an offset 41 adjacent their ends so that as the gas is being compressed as is shown to the right in the upper portion of Figure 6 said compression gas will engage this offset so as to tightly maintain the blade against the inner surface of the wall of the stator casing. Otherwise, this modification operates in the same manner with the embodiment first described. Pockets 42 are provided in the outer surface of the rotor 13' in order that the offset portion 41 may be received therein.

By particular reference to Figure 3, it will be noted that the hollow rotor is turnable in the fixed casing 6, but that the hollow trunnions 14 of the rotor are journaled in standard portions 16; also, that the said trunnions 14 are open at their outer ends and are calculated to effect full and free communication between the hollows of the rotor and the atmosphere so that heat is adequately radiated from the interior of the rotor to the atmosphere with the result that the liability of the engine becoming unduly heated is reduced to a minimum. Again it will be appreciated that the structure indicated is advantageous because it lends itself to lightness, as is desirable.

It is preferable to provide a gear 43 on one of the trunnions 14. A platform 44 is mounted on one of the standards 11 and has a generator or magneto 45 thereon with its shaft provided with a gear 46 meshing with the gear 43. This magneto or generator furnishes current for the spark plugs 35 and 36.

It is thought that the construction, operation, and advantages of this invention will be clearly understood without a more detailed description thereof. It is apparent, however, that numerous changes in the details of construction, and in the combination and arrangement of parts may be resorted to without departing from the spirit or scope of the invention as hereinafter claimed or sacrificing any of its advantages.

Having thus described my invention, what I claim as new and desire to secure by Letters Patent is:—

1. In a rotary internal combustion engine, a stator casing, a partition dividing the casing into a compression compartment and an expansion compartment, a hollow rotor having portions turnable in said compartments and provided with hollow trunnions extending through the sides of the casing and connecting the interior of the rotor and the atmosphere, a pair of standards in which the hollow trunnions are journaled, blades slidably mounted in the portions of the rotor, a shaft extending through the casing, through and separated by intervening spaces from the hollow trunnions and also extending through the rotor, standards supporting the extremities of the shaft and holding said shaft stationary, cam elements fixed to the shafts for actuating the blades in engagement with the outer walls of the compartments as the rotor turns, said compartments provided with a passage communicating theretogether, the portion of the rotor in the expansion chamber provided with pockets adjacent its blade for registry with the passage so that the gas under compression may be delivered thereto.

2. A rotary internal combustion engine comprising a stationary casing having intake and exhaust means, a hollow rotor turnable in the casing and having tubular end journals in full and free communication with the hollow of the rotor and the atmosphere, blades carried in and by the rotor and movable radially thereof and also movable in the casing, a pair of standards in which the hollow trunnions are journaled, a shaft extending through the casing and through and separated by intervening spaces from the hollow trunnion and also extending through the rotor, standards supporting the extremities of the shaft and holding said shaft stationary, and means for reciprocating the blades by the shaft incident to the turning of the rotor about the shaft.

In testimony whereof I affix my signature.

ARTHUR B. CRAIG.